United States Patent
Treat et al.

(10) Patent No.: US 9,016,695 B2
(45) Date of Patent: Apr. 28, 2015

(54) GAS TURBINE EXHAUST NOZZLE DIVERGENT FLAP SEAL

(75) Inventors: Christopher Treat, Manchester, CT (US); Christina A. Stenman, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 410 days.

(21) Appl. No.: 13/196,074

(22) Filed: Aug. 2, 2011

(65) Prior Publication Data

US 2013/0033005 A1 Feb. 7, 2013

(51) Int. Cl.
*F16J 15/02* (2006.01)
*F16J 15/06* (2006.01)
*F02K 1/80* (2006.01)

(52) U.S. Cl.
CPC ............ *F16J 15/061* (2013.01); *F02K 1/805* (2013.01); *F16J 15/025* (2013.01)

(58) Field of Classification Search
USPC .......................................... 277/630, 637, 644
See application file for complete search history.

(56) References Cited

U.S. PATENT DOCUMENTS

| | | | |
|---|---|---|---|
| 3,354,649 A * | 11/1967 | Madden ........................... | 60/770 |
| 4,013,226 A | 3/1977 | Willard | |
| 4,171,093 A * | 10/1979 | Honeycutt et al. ......... | 239/127.3 |
| 4,392,615 A * | 7/1983 | Madden .................. | 239/265.37 |
| 4,575,006 A | 3/1986 | Madden | |
| 4,575,099 A * | 3/1986 | Nash .............................. | 277/345 |
| 4,587,806 A * | 5/1986 | Madden .......................... | 60/771 |
| 5,076,496 A * | 12/1991 | Lippmeier ............... | 239/265.41 |
| 5,078,412 A * | 1/1992 | Baumgarth ................... | 277/345 |
| 5,143,292 A | 9/1992 | Corsmeier et al. | |
| 6,109,022 A * | 8/2000 | Allen et al. ..................... | 60/223 |
| 6,227,634 B1 * | 5/2001 | Cittadini et al. .............. | 312/296 |
| 6,286,303 B1 * | 9/2001 | Pfligler et al. .................. | 60/805 |
| 6,295,805 B1 | 10/2001 | Lackey et al. | |
| 6,402,466 B1 * | 6/2002 | Burdgick et al. .......... | 415/173.3 |
| 6,419,238 B2 * | 7/2002 | McComb ...................... | 277/630 |
| 6,431,555 B1 * | 8/2002 | Schroder et al. .............. | 277/628 |
| 6,447,252 B1 * | 9/2002 | Barker et al. ................. | 416/211 |
| 6,464,457 B1 * | 10/2002 | Morgan et al. ............ | 415/174.2 |
| 6,533,288 B1 * | 3/2003 | Brandner et al. ............. | 277/630 |
| 6,854,738 B2 * | 2/2005 | Matsuda et al. ............... | 277/632 |
| 7,775,048 B2 | 8/2010 | Grammel, Jr. | |
| 7,909,570 B2 | 3/2011 | Durocher et al. | |
| 8,006,983 B2 * | 8/2011 | Russell et al. ................ | 277/314 |
| 8,123,231 B2 * | 2/2012 | McComb ...................... | 277/630 |
| 8,201,413 B2 * | 6/2012 | Lavin et al. ..................... | 60/766 |
| 8,308,428 B2 * | 11/2012 | Bridges et al. ................ | 415/139 |
| 2002/0109305 A1 * | 8/2002 | Castner ........................ | 277/630 |
| 2003/0222411 A1 * | 12/2003 | Simon .......................... | 277/630 |
| 2004/0239050 A1 * | 12/2004 | Antunes et al. ............... | 277/630 |

* cited by examiner

*Primary Examiner* — Vishal Patel
*Assistant Examiner* — L. Susmitha Koneru
(74) *Attorney, Agent, or Firm* — Carlson, Gaskey & Olds, P.C.

(57) ABSTRACT

A seal assembly for a nozzle in a gas turbine engine includes a connector having a first hinge portion for attaching to the nozzle, a flat portion for sealing against a wall of the engine; and a first hinge for attaching the connector to the flat portion wherein the connector is adapted to rotate relative to the nozzle and the flat portion is adapted to rotate relative to the connector.

14 Claims, 7 Drawing Sheets

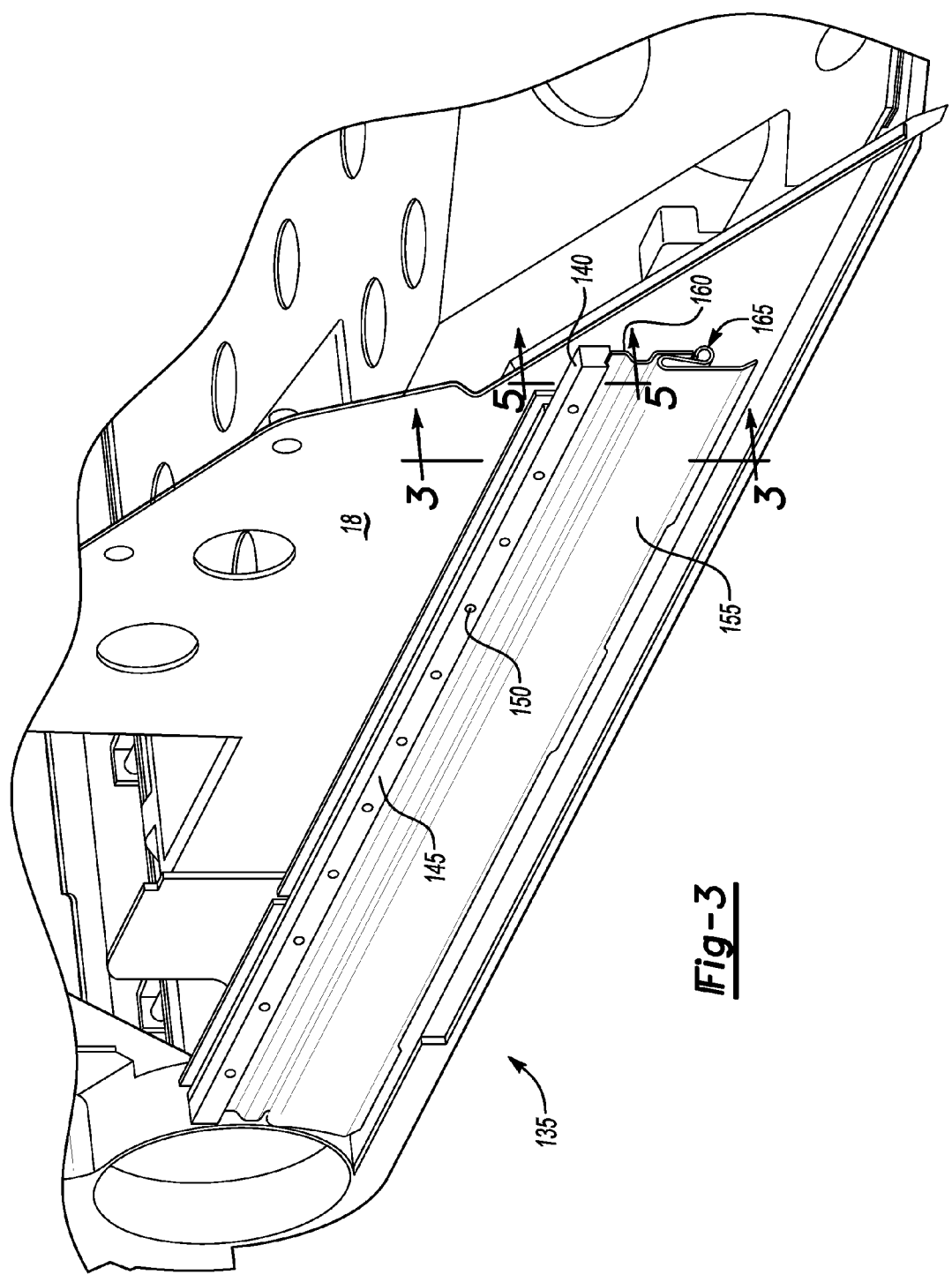

GAS TURBINE EXHAUST NOZZLE DIVERGENT FLAP SEAL

BACKGROUND

The present invention relates to gas turbine engines having convergent/divergent nozzles, and more particularly to a nozzle having an efficient flap seal.

A variable area exhaust nozzle may optimize the thrust produced within a gas turbine engine. In augmented gas turbine engines, variable area, convergent/divergent nozzles provide a multitude of nozzle positions. Exhaust gases exiting the turbines pass through the generally decreasing diameter convergent section before passing through the increasing diameter divergent section.

The convergent section may be pivotally connected to a static outer case and to the divergent section. The divergent section may be pivotally connected to the convergent section and to an actuating system radially outboard of the divergent section. The opposite end of the external bearing is pivotally attached to a static outer case.

The convergent and divergent sections generally include flap seals attached to the convergent or divergent sections or a structural member within the engine. The flap seals accommodate changes in an orifice area by sliding as the orifice area decreases or increases.

SUMMARY

According to an embodiment described herein, a seal assembly for a nozzle in a gas turbine engine includes a connector having a first hinge portion for attaching to the nozzle, a flat portion for sealing against a wall of the engine; and a first hinge for attaching the connector to the flat portion wherein the connector is adapted to rotate relative to the nozzle and the flat portion is adapted to rotate relative to the connector.

According to a further embodiment described herein, a seal assembly for a gas turbine engine includes a connector having a first hinge portion attaching to an engine nozzle, a flat portion sealing against a wall of the gas turbine engine; and a first hinge attaching the connector to the flat portion wherein the connector rotates relative to the nozzle and the flat portion rotates relative to the connector.

According to a still further embodiment described herein, a method of sealing a divergent flap against an edge of an engine wall includes the steps of rotating a connector relative to the divergent flap in response to pressure of gases passing from the engine and rotating a seal relative to the connector in response to the pressure of gases passing from the engine such that the seal seals against the engine wall.

The various features and advantages of the disclosed examples will become apparent to those skilled in the art from the following detailed description. The drawings that accompany the detailed description can be briefly described as follows.

BRIEF DESCRIPTION OF THE DRAWING

FIG. 3 shows a schematic view perspective of a flap seal attaching to a divergent flap as disclosed herein.

DETAILED DESCRIPTION

Figure 1A:
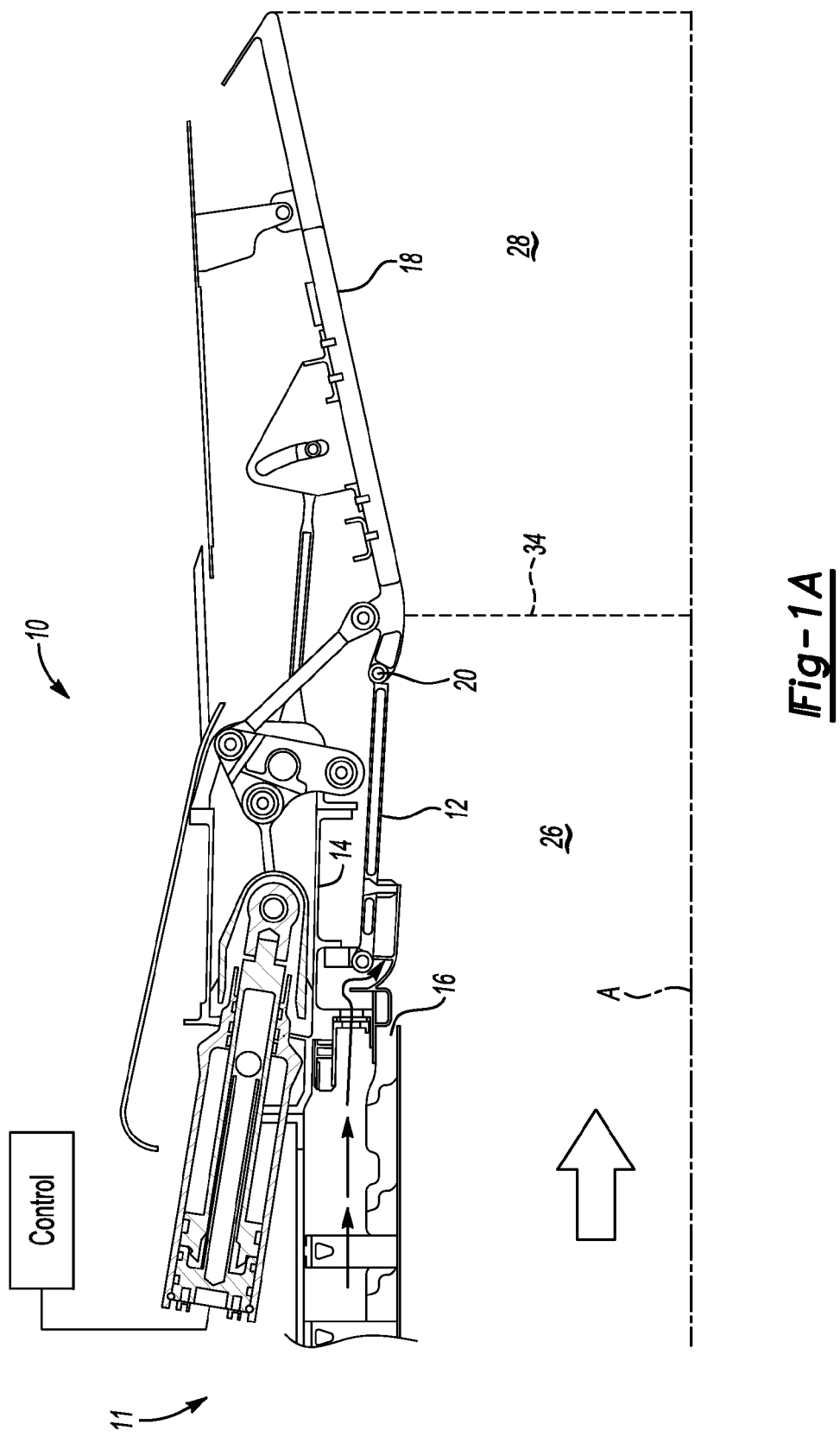
FIG. 1A is a general sectional side view of a variable geometry exhaust nozzle as shown in a maximum position, the nozzle being illustrated on one side of its centerline.
Figure 1B:
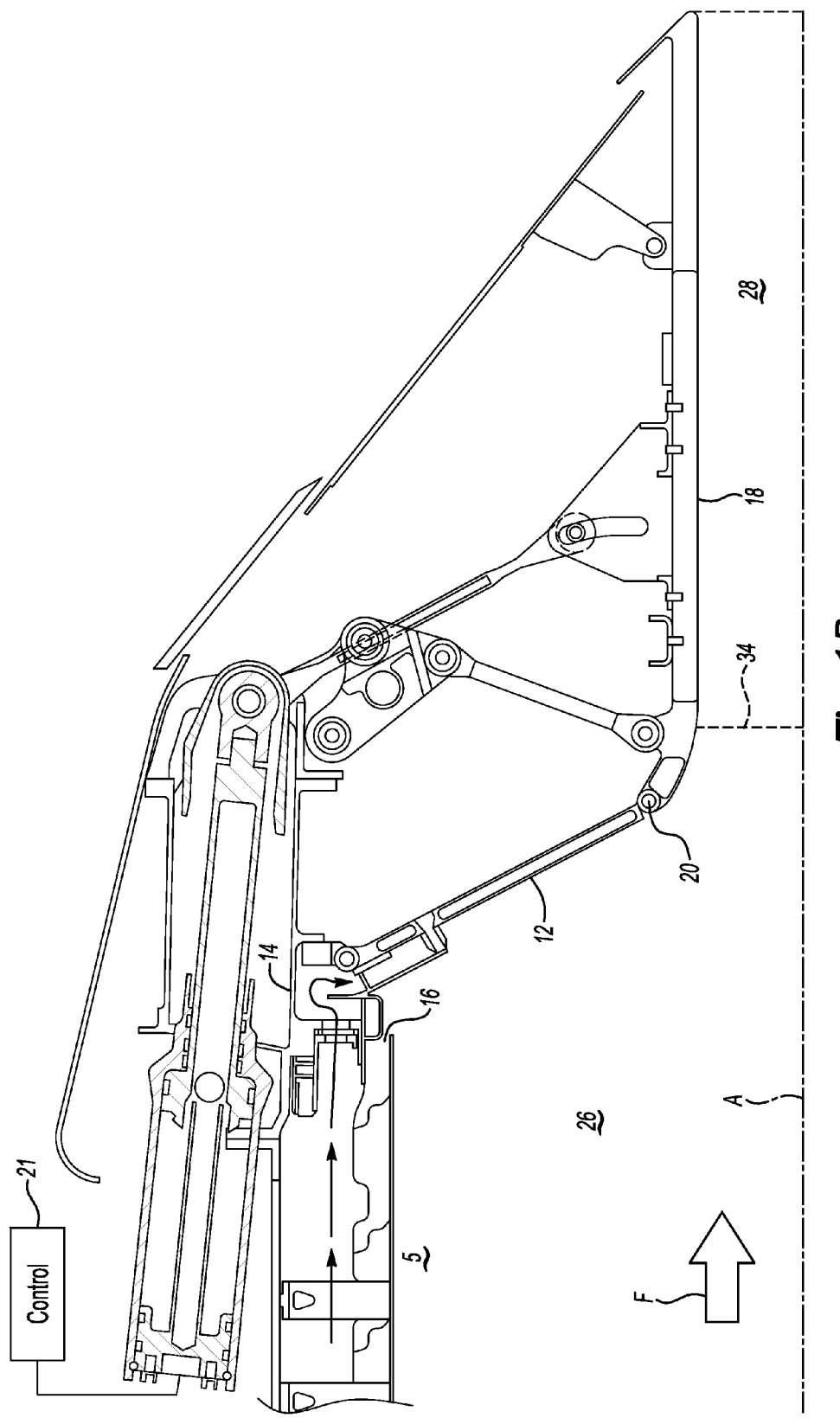
FIG. 1B is a general sectional side view of a variable geometry exhaust nozzle shown in a minimum position, the nozzle being illustrated only one side of its centerline.

Referring to FIGS. 1A and 1B, a nozzle system 10 for a gas turbine engine 11 is shown. A nozzle system 10 includes a plurality of distributed convergent flaps 12 (only one shown in section), each pivotally connected to a stationary frame 14 with a cooling liner panel 16 upstream thereof. A plurality of distributed divergent flaps 18 (only one shown in section), are pivotally connected to a joint 20 to an aft section of the convergent flaps 12.

Taken collectively, the convergent and divergent flaps 12, 18 define a nozzle centerline A that defines a boundary of an exhaust gas path. During operation, a control system 21 governs the angular orientation of the convergent flaps 12 and the divergent flaps 18 to adjust a nozzle throat area 34.

FIG. 1A depicts the nozzle 10 in a maximum dilated position, which may be used during use of an afterburner (not shown), and FIG. 1B depicts a nozzle system 10 in a minimally dilated position, which is typically used if the afterburner is not being used.

Figure 2:
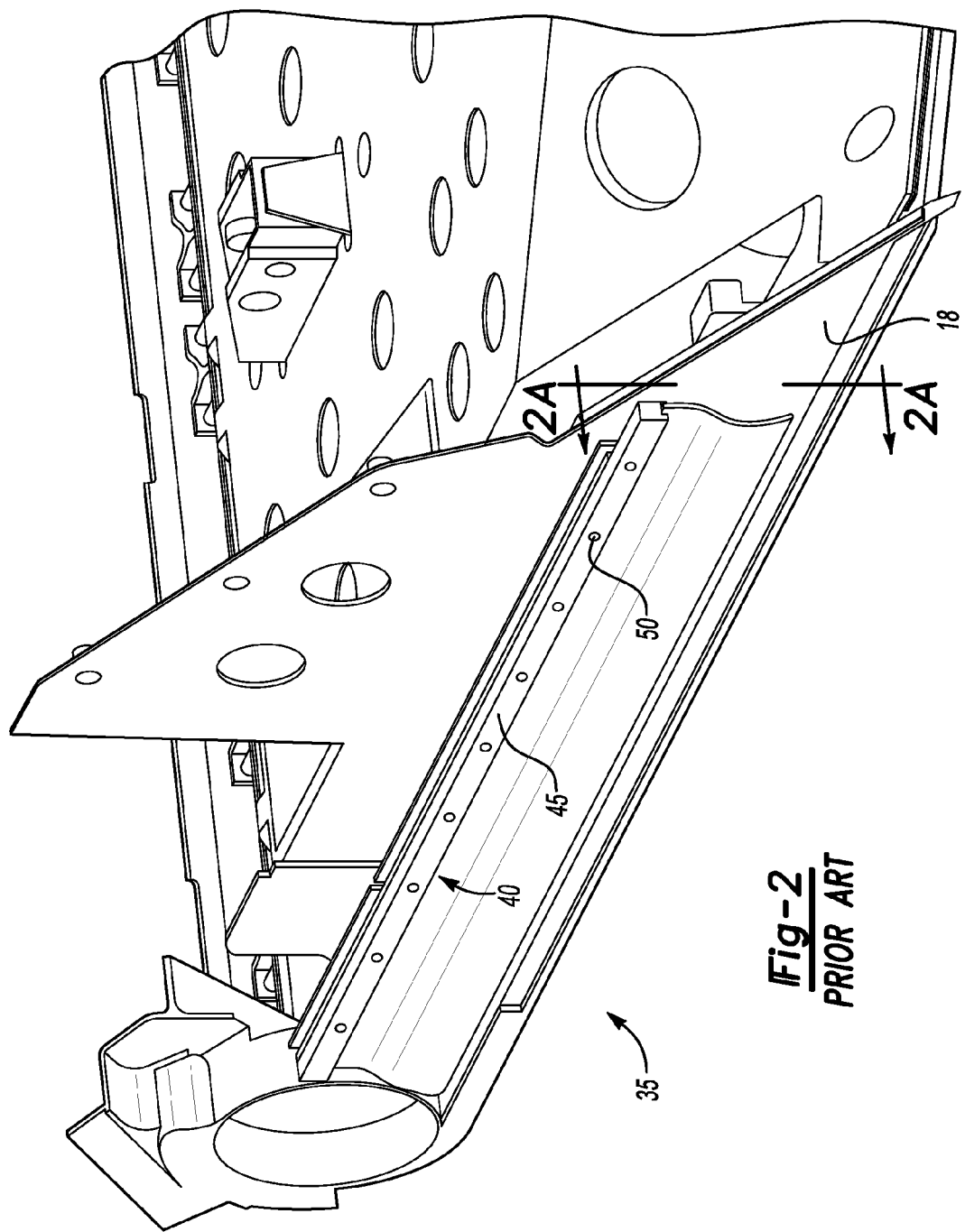
FIG. 2 shows a perspective view of a prior art divergent flap including a flap seal.

Referring now to FIG. 2, a prior art flap seal assembly 35 is attached to a divergent flap 18 by a retention bar 40. The retention bar has a rectangular body 45, a plurality of fastener holes 50 which receive fasteners (not shown) to attach the rectangular body 45 to the divergent flap 18.

Figure 2A:
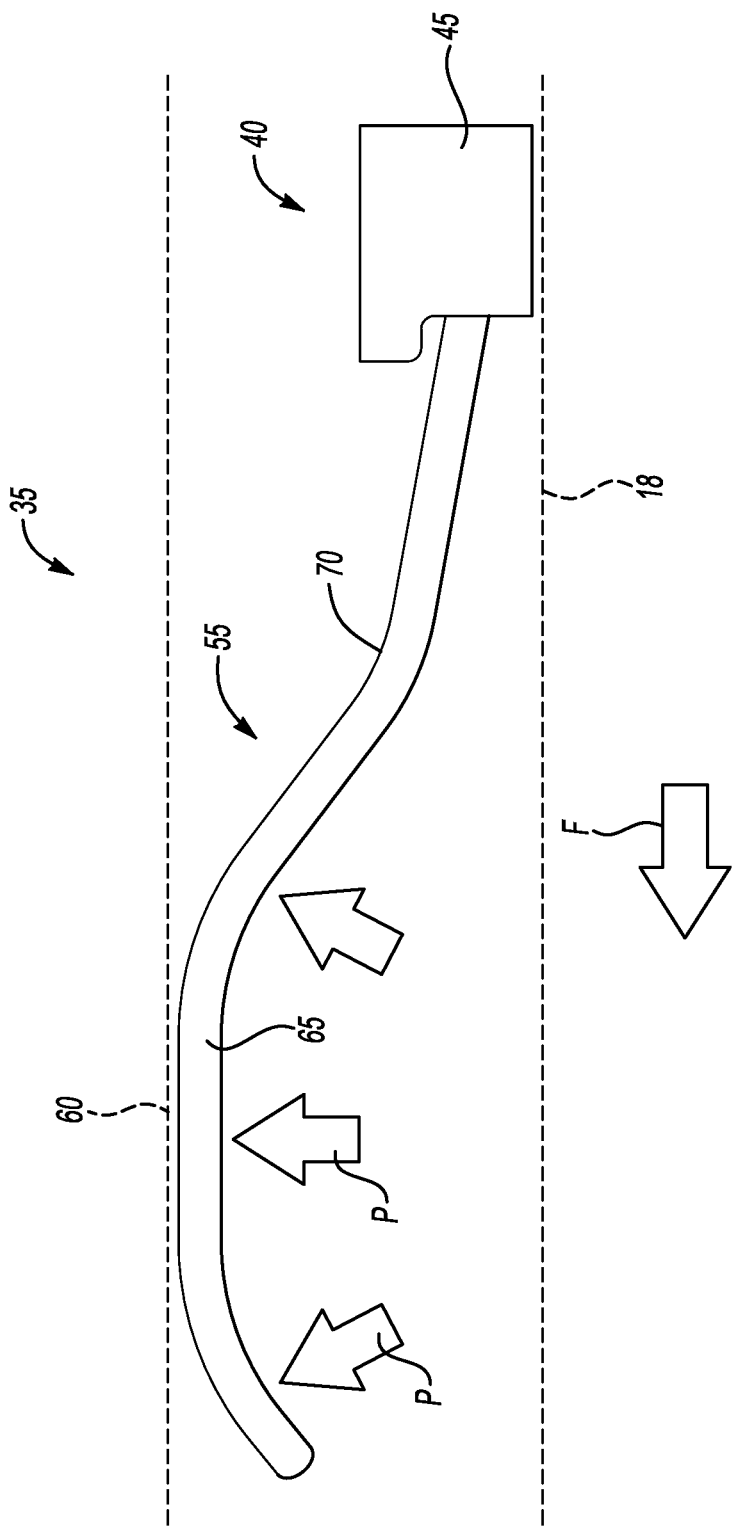
FIG. 2A shows a sectional view taken along the lines 2-2 of the prior art flap seal of FIG. 2.

Referring now to both FIGS. 2 and 2A, the seal 55 is designed to seal against sidewall 60 of the engine to ensure the thrust in exhaust gases F are directed properly through the nozzle assembly 10. Pressure P from the exhaust gases F forces the seal 55 against the sidewall 60 that is flat to provide a seal therebetween. The seal 55 has a flat portion 65 for sealing against the flat sidewall 60 and a bent portion 70 for attaching to the rectangular body 45 as is known in the art. However, the Applicants have discovered that the pressure P also exerts force on the sidewall 60 thereby causing the sidewall 60 to bow. Because the seal 55 hinges about the retention bar 40, if the sidewall 60 bows, it is improbable that the sidewall and the flat portion 65 creates any more than line contact with each other. A line seal may not be sufficient to provide adequate sealing for required performance of the engine 5 (see FIG. 1). The flat portion 65 cannot move in concert with the wall 60 as pressure is applied.

Figure 4:
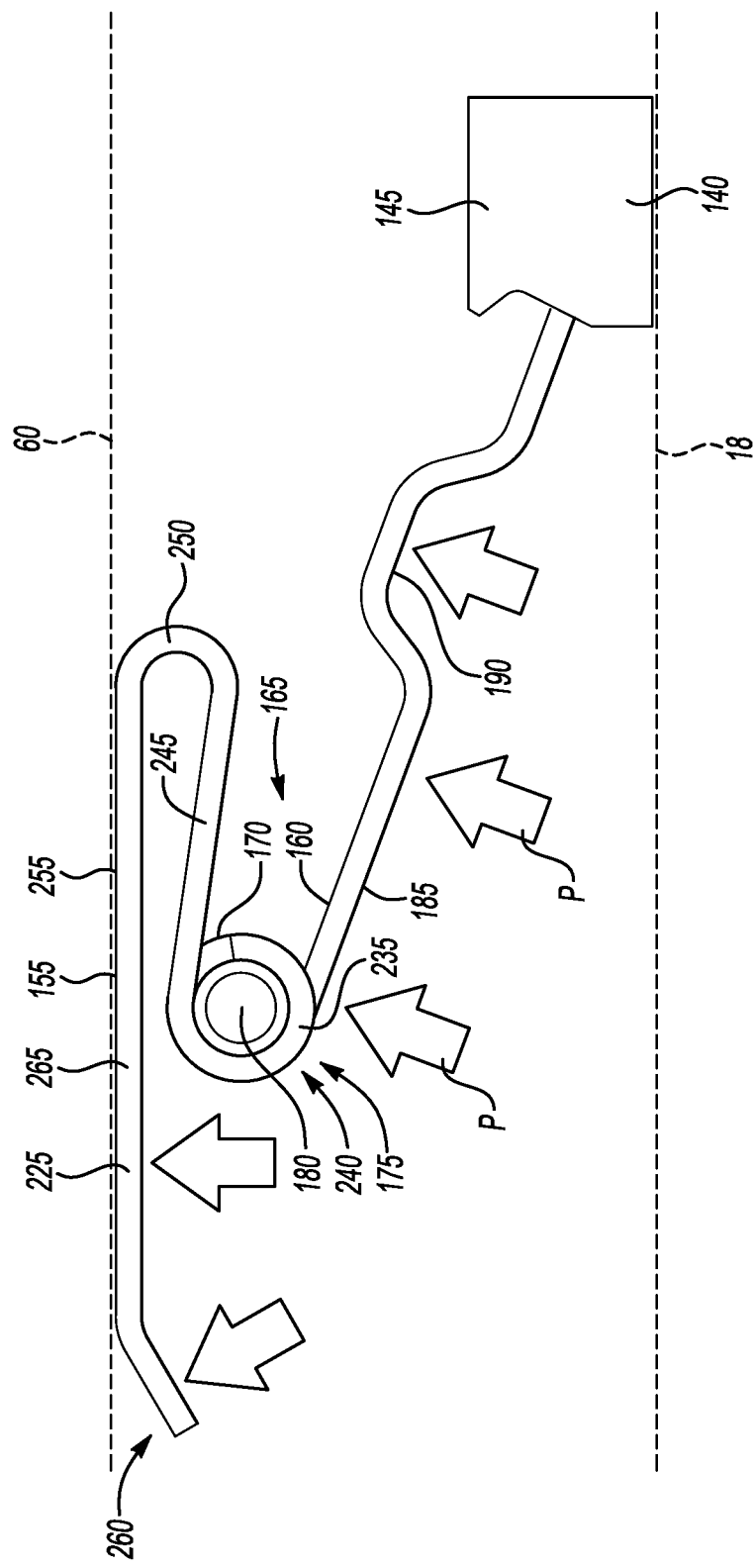
FIG. 4 shows a schematic view taken along the lines 3-3 of FIG. 3 of the divergent flap of FIG. 3.
Figure 5:
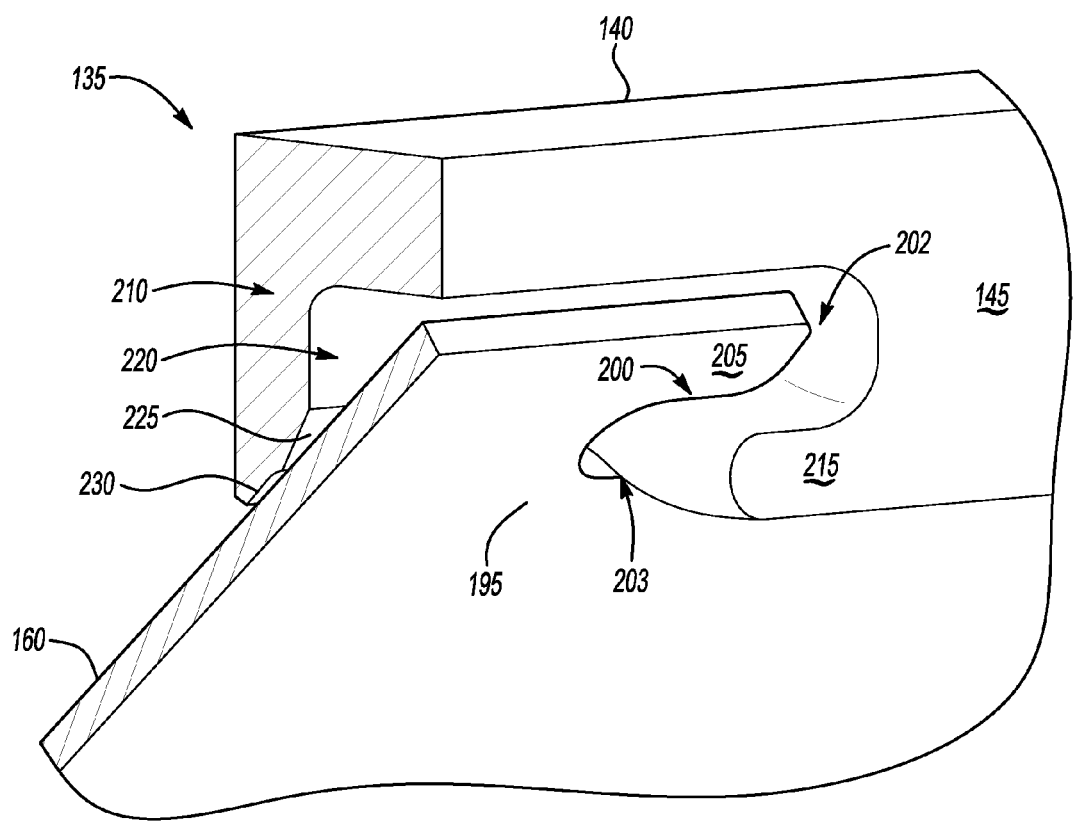
FIG. 5 is a cross-sectional, perspective view taken along the lines 5-5 of FIG. 4 shown in a joint between the flap seal and a retention bar for holding flap seal.

Referring now to FIGS. 3-5, a flap seal assembly 135 is shown. The flap seal assembly 135 includes retention bar 140 having a generally rectangular body 145 having a plurality of fastener holes 150 through which fasteners (not shown) attach the retention bar to the divergent nozzle 18. The flap seal assembly in this example includes a first sealing member, or seal 155, which is attached to a second sealing member, or connector 160, via a hinge 165. The connector 160 attaches to the retention bar (or member) 140 as will be discussed infra.

The connector 160 has a plurality of spaced, knurled fingers 170 at first end 175. The knurled fingers 170 grip pin 180 as is known in the art. The connector 160 has a flat body 185 with an indentation 190. The indentation 190 provides axial stiffness of connector 160. At a second end 195, the flat body 185 attaches to the retention bar 140.

Referring now to FIG. 5, the second end 195 has a plurality of notches having an L-shape 200 forming a cutout 202 (see also FIG. 5) and a transverse opening 203 relative to the cutout 202 to create the plurality of fingers 205 in the end portion of the flat body 185.

The retention member or bar 140 has a complex shaped opening 210 for receiving fingers 205. A complex shape of the opening 210 allows the flat body to 185 to rotate relative to the divergent flap 18 and the retention bar 140 without requiring a piano type hinge. A lip 215 extends into the transverse opening 203 of the flat body 185. A generally rectangular space 220 allows fingers 205 to rotate therein. A first chamfered surface 225 angles outwardly away from the divergent flap 18 at an angle to allow the flat body 185 to rotate a particular degree. A second chamfered surface 230 allows the flat body 185 to rotate even further. As the flat body rotates about the chamfered surfaces 225 and 230, the finger 205 moves in the rectangular space 220.

Seal 155 has a hairpin shape. It has a plurality of knurled fingers 235 at a first end 240 thereof for a grasping the pin 180. The knurled fingers 235 cooperate with the knurled fingers 170 of the flat body 185 so that the seal 155 rotates about pin 180 independent of motion of the flat body 185. The seal 155 has a first flat area 245 extending from the knurled fingers 235 to a bend area 250 which bends a bit more than 180° to form the hairpin shape of the seal 155. The bend area 250 attaches to a second flat area 225 which is adapted to contact the sidewall 60 over a large area. A second end portion 260 of the seal 155 attaches to the second flat area 225. The hinge pin 180 is disposed about a midpoint of 265 of the second flat portion 255. The purpose of the hairpin shape is to evenly distribute load between the flat portion 155 and the engine wall 60 by transferring the load induced by the connector 185, around the bend 250.

In operation, pressure P urges the first flat body 185 outwardly away from the divergent flap 18. The pressure P also urges the seal 155 towards the sidewalls. Rotation of the flat body 185 continues until the flat portion 255 is flat against the sidewall 60. If the second end 260 hits the sidewall 60 first, continued rotation of the flat body and rotation of the seal 155 relative to the flat body 185 about hinge pin 180 urges the second flat body 255 against the sidewall. If the sidewall 60 bows due to the pressure P, rotation of the flat body 185 in conjunction with the rotation of the seal 155 relative to the flat body 185 allows the seal 155 to continue to adhere to the sidewall 60 regardless of the bowing, the second flat area 255 continuing to attach along a large area of the sidewall 60.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal assembly for a nozzle in a gas turbine engine, said assembly comprising:
 a first sealing member including a connector, said connector having a first hinge portion for attaching to said nozzle;
 a second sealing member including a flat portion for sealing against a wall of said engine;
 a pin providing a first hinge, each of said first sealing member and said second sealing member rotatably connected to said pin, wherein said connector is adapted to rotate relative to said nozzle and said flat portion is adapted to rotate relative to said connector;
 wherein said second sealing member includes a first knurled finger bent around said pin to allow said second sealing member to rotate relative to said pin;
 wherein said first sealing member includes a second knurled finger bent around said pin to allow said first sealing member to rotate relative to said pin; and
 wherein said first sealing member is a single structure, and wherein said second sealing member is a single structure.

2. The seal assembly of claim 1 wherein said seal assembly further comprises an retention bar for attaching to said nozzle, wherein said retention bar has a second hinge portion, said first hinge portion of said connector and said second hinge portion of said retention bar cooperate to form a second hinge.

3. The seal assembly of claim 2 wherein said first hinge portion of said connector is a finger.

4. The seal assembly of claim 3 wherein said second hinge portion of said retention bar is a hollow area in said retention bar in which said finger is disposed.

5. The seal assembly of claim 4 wherein said hollow area has a first chamfered surface extending therefrom to allow increased rotation of said connector as said finger moves within said hollow area.

6. The seal assembly of claim 5 wherein said hollow area has a second chamfered surface extending from said first chamfered area to allow further increased rotation of said connector as said finger moves within said hollow area.

7. The seal assembly of claim 1 wherein said connector has an indentation therein for providing axial stiffness of said connector.

8. The seal assembly of claim 1 wherein said second sealing member has a bent portion between said first hinge and said flat portion, wherein said bent portion forms a hair pin shape.

9. The seal assembly of claim 8 wherein said bent portion bends greater than 180°.

10. The seal assembly of claim 8 wherein said connector has an indentation therein for providing axial stiffness of said connector, said indentation provided between said first hinge and said first hinge portion of said connector.

11. The seal assembly of claim 1 wherein said second sealing member includes a flat area extending between said first knurled finger and a bent portion, the bent portion connecting said flat area to said flat portion.

12. The seal assembly of claim 11 wherein said bent portion bends greater than 180° between said flat area and said flat portion.

13. The seal assembly of claim 1 wherein said first sealing member includes an indentation between said second knurled finger and said first hinge portion of said connector.

14. The seal assembly of claim 1 wherein said first sealing member directly contacts both of said nozzle and said pin, and wherein said second sealing member directly contacts both of said wall of said engine and said pin.

* * * * *